United States Patent
Sankarasubramanian et al.

(10) Patent No.: US 9,799,881 B2
(45) Date of Patent: Oct. 24, 2017

(54) ALLOYS AS CATHODE MATERIALS FOR LITHIUM-AIR BATTERIES

(71) Applicants: Toyota Motor Engineering & Manufacturing North America, Inc., Erlanger, KY (US); Illinois Institute of Technology, Chicago, IL (US)

(72) Inventors: Shrihari Sankarasubramanian, Chicago, IL (US); Jai Prakash, Naperville, IL (US); Fuminori Mizuno, Ann Arbor, MI (US); Nikhilendra Singh, Ypsilanti, MI (US)

(73) Assignees: Toyota Motor Engineering & Manufacturing North America, Inc., Erlanger, KY (US); Illinois Institute of Technology, Chicago, IL (US)

( * ) Notice: Subject to any disclaimer, the term of this patent is extended or adjusted under 35 U.S.C. 154(b) by 143 days.

(21) Appl. No.: 14/697,122

(22) Filed: Apr. 27, 2015

(65) Prior Publication Data

US 2016/0315329 A1    Oct. 27, 2016

(51) Int. Cl.
| | |
|---|---|
| *H01M 4/90* | (2006.01) |
| *H01M 4/38* | (2006.01) |
| *H01M 12/08* | (2006.01) |
| *H01M 4/86* | (2006.01) |
| *H01M 4/92* | (2006.01) |

(52) U.S. Cl.
CPC ......... *H01M 4/382* (2013.01); *H01M 4/8673* (2013.01); *H01M 4/921* (2013.01); *H01M 12/08* (2013.01); *H01M 2300/0025* (2013.01); *H01M 2300/0045* (2013.01); *H01M 2300/0071* (2013.01); *Y02E 60/128* (2013.01)

(58) Field of Classification Search
CPC .. H01M 12/08; H01M 2220/20; H01M 4/382; H01M 4/9041
See application file for complete search history.

(56) References Cited

U.S. PATENT DOCUMENTS

| | | | | |
|---|---|---|---|---|
| 2010/0197490 A1* | 8/2010 | Adzic | ................... | B82Y 30/00 502/326 |
| 2012/0315553 A1* | 12/2012 | Mizuno | ............... | H01M 10/052 429/403 |
| 2013/0085061 A1* | 4/2013 | Stamenkovic | ............ | C22C 1/02 502/185 |

OTHER PUBLICATIONS

J. Zhang, F. H. B. Lima, M. H. Shao, K. Sasaki, J. X. Wang, J. Hanson, and R. R. Adzic. Platinum Monolayer on Nonnoble Metal-Noble Metal Core-Shell Nanoparticle Electrocatalysts for O2 Reduction, J. Phys. Chem. B, 2005, 109, 22701-22704.*

* cited by examiner

*Primary Examiner* — Carlos Barcena
(74) *Attorney, Agent, or Firm* — Oblon, McClelland, Maier & Neustadt, L.L.P.

(57) ABSTRACT

A Li-air battery is provided. The battery contains: an anode compartment containing lithium or a lithium alloy as active metal; a cathode compartment supplied with an $O_2$ source; and a lithium ion conductive membrane separating the anode compartment from the cathode compartment. The cathode compartment contains an air electrode with a skin alloy platinum or palladium catalyst.

17 Claims, 4 Drawing Sheets

ALLOYS AS CATHODE MATERIALS FOR LITHIUM-AIR BATTERIES

BACKGROUND

The present invention is directed to a lithium(Li)-air battery having high energy density and cyclability.

Lithium ion technology has dominated the market as an energy source for small electronic devices and even plug-in hybrid and electric vehicles. However, Li-ion batteries provide insufficient energy density to act as a power source for future generations of electric vehicles, which would require the use of higher energy density power sources.

Metal-air batteries have been under investigation as an advanced generation of high energy density, energy sources which have the potential to power vehicles for distances comparable to present fossil-fuel based combustion engines. In a metal-air battery, the metal of the anode is oxidized and the resulting cation travels to the cathode containing a porous matrix of a material such as carbon, for example, where oxygen is reduced and the reduction product combines with the metal cation to form the oxide, superoxide or peroxide discharge product. Upon charge, this process is ideally reversed. Metal-air batteries are recognized to have potential advantages over metal-ion batteries because the cathode material, oxygen, may be obtained from the atmosphere, and thus the capacity of the battery would in theory be limited by the anode metal supply. Thus, an oxygen gas supply would be supplied continuously from outside the battery and battery capacity and voltage would depend upon the oxygen reducing properties of the cathode and the chemical nature of the discharge product formed.

For example, Li-air batteries use inexhaustible oxygen from outside (i.e. air) instead of storing an oxidizer inside. Therefore, a Li-air battery has much higher energy density when compared with a conventional Li-ion battery and has potential for application in the field of long-range electric vehicles. However, unsolved fundamental problems such as poor oxygen redox kinetics at the cathode and deleterious volume and morphology changes at the negative electrode greatly limit the practical application of Li-air batteries.

Li-air batteries have the potential to supply 5-10 times greater energy density than conventional lithium ion batteries and have attracted much interest and development attention as a post Li-ion battery technology. For example, a non-aqueous Li-air battery which forms $Li_2O_2$ as discharge product theoretically would provide 3038 Wh/kg in comparison to 600 Wh/kg for a Li-ion battery having a cathodic product of $Li_{0.5}CoO_2$. However, in practice, the metal air technology and specifically current non-aqueous lithium air batteries suffer many technical problems which have prevented achievement of the theoretical capacity.

The capacity of the Li-air battery is highly dependent upon the capacity of the cathode matrix to store the $Li_2O_2$ discharge product. $Li_2O_2$ is generally insoluble in conventional non-aqueous solvents employed in metal-air batteries. Therefore, upon formation at the cathode matrix, the $Li_2O_2$ precipitates and fills the surface porosity of the matrix thus preventing access to the vacant capacity of the matrix interior region. Moreover, $Li_2O_2$ is an insulator and therefore, once the surface of the matrix is coated, oxygen reduction is prevented and discharge terminated, i.e., the capacity of the battery is severely reduced in comparison to the theoretical capacity.

Cathodes containing catalysts to facilitate and enhance the oxygen reduction reaction are known and have been the subject of ongoing studies in both the academic and industrial sectors. Catalysts based on noble metals, metal oxides, metal alloys and carbon nanotubes have been described.

However, to successfully replace Li-ion cells, Li-air batteries having improved cycle life, improved coulombic efficiency and increased energy density must be developed.

Key problems that must be addressed to achieve success with Li-air battery technology include electrolyte stability, deposition of $Li_2O_2$ and passivation of catalyst surfaces.

The products of oxygen reduction at the cathode of a Li-air battery include lithium peroxide ($Li_2O_2$) which is generally insoluble in the electrolyte medium and therefore, precipitates onto available surfaces of the matrix and catalyst. Once formed the $Li_2O_2$ is difficult to decompose during charging of the battery and therefore $Li_2O_2$ deposits build on the catalytic surfaces and adversely retard catalytic performance.

This problem must be addressed and overcome to develop and produce an efficient, safe, cost effective, high capacity Li-air battery useful especially for powering vehicles to distances at least equal to or competitive with current fossil-fuel systems.

SUMMARY

This and other objects are addressed by the various embodiments of the present invention, the first embodiment of which includes a Li-air battery, comprising:

an anode compartment comprising lithium or a lithium alloy as active metal;

an air cathode compartment comprising an air cathode having a matrix and a skin alloy catalyst;

an oxygen supply to the air cathode;

an electrolyte; and a Li-ion conductive membrane separating the anode from the cathode;

wherein the skin alloy catalyst comprises palladium and/or platinum metal having lattice positions of sub-atomic layers substituted with at least one metal atom selected from the group consisting of iron atoms, cobalt atoms, nickel atoms and copper atoms.

A further embodiment includes a Li-air battery according to the first embodiment wherein the substitution of metal atoms is in the first four atomic layers of the palladium and/or platinum metal.

In one specific embodiment a Li-air battery according to the first embodiment wherein the catalyst is platinum metal having a skin alloy comprising of cobalt is provided.

In a second specific embodiment a Li-air battery according to the first embodiment wherein the catalyst is palladium metal having a skin alloy comprising iron is provided.

The foregoing paragraphs have been provided by way of general introduction, and are not intended to limit the scope of the following claims. The presently preferred embodiments, together with further advantages, will be best understood by reference to the following detailed description taken in conjunction with the accompanying drawings.

DESCRIPTION OF THE PREFERRED EMBODIMENTS

The present inventors are conducting a broad and detailed study of post-Li-ion battery technologies seeking to identify and develop new and improved energy storage systems having capacity and voltage suited to specific uses. Li-air batteries having high capacity and high working potential are targets of such study and in this ongoing study the inventors have investigated the effect of surface structure and composition of the noble metals platinum and palladium relative to the oxygen reduction reaction (ORR).

The inventors have recognized that an important aspect of catalyst activity, efficiency and lifetime is the binding and release of both reactants and products to and from the catalyst surface.

Figure 1:
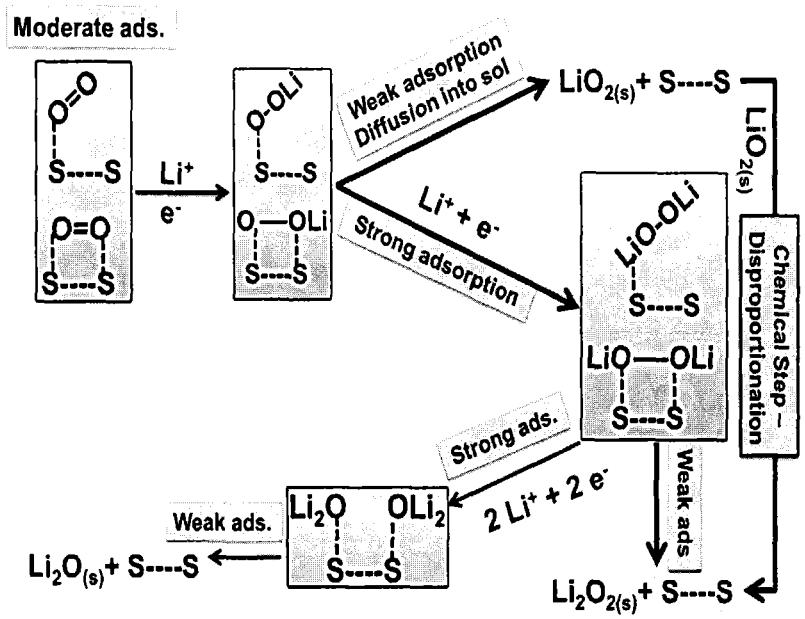
FIG. 1 shows a diagram of the lithium ORR pathways considered in the present invention.

FIG. 1 shows a summary of postulated reaction pathways for catalyzed oxygen reduction. The inventors have considered that for effective catalytic activity a catalyst must have high binding energy for oxygen ($O_2$) and superoxide radicals ($O_2^*$) while having low binding energy for lithium peroxide ($Li_2O_2$).

Thus oxygen would be retained on the catalyst surface (S—S) and made available for reduction while $Li_2O_2$ when formed would be released from the catalyst surface making the surface available for binding oxygen and further ORR.

Figure 2:
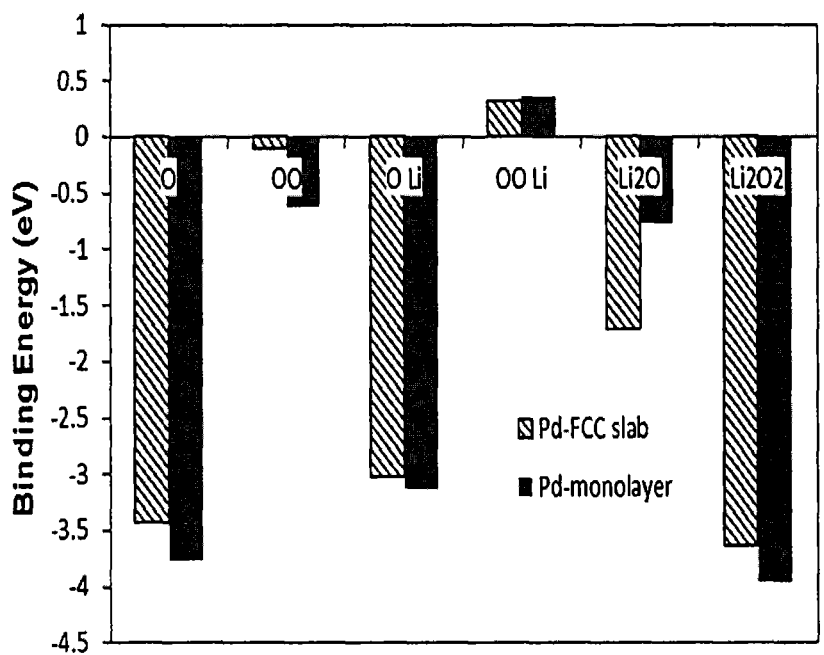
FIG. 2 shows a comparison of the binding energies of various intermediates of the ORR pathway for a palladium multi-layer slab and a Pd monolayer.

As a measure of binding properties, Density Functional Theory (DFT) analyses were conducted for classical catalysts including noble metals and carbon catalysts. The inventors have determined that sub-atomic layers of the catalyst surface affect the surface activity of the metal. FIG. 2 shows a comparison of the binding energies of various intermediates of the ORR pathway for a palladium multilayer slab and a Pd monolayer. Unexpectedly, the binding energies differ and although not wishing to be bound by theory, the inventors believe that the underlying atomic layers to the surface atomic layer have an influence on the d-electron density of the surface noble metal shell. As the catalyst activity is related to a ligand type interaction between the reaction pathway species and the catalyst metal at the catalyst surface, modification of d-electron density at the surface would affect catalytic activity. Thus, as shown in FIG. 2 the more electronegative species are more strongly attracted to the catalyst surface while the less electronegative species are attracted to a lesser extent. This analysis has led to the study of skin alloy structure materials as catalysts for the lithium ORR reaction.

Skin alloys are a class of alloys with a topmost atomic layer of noble metal such as platinum and palladium and sub-layers wherein metal lattice positions are substituted with metal atoms different from the noble metal. As used herein, the substituted metal is referred to as "substituent metal," "alloy metal" or "dopant."

Permutations and selected skin alloy derivatives thereof and the calculated results identified that certain skin alloy derivatives of palladium and platinum have significantly higher binding energy for $O_2$ and $O_2^*$ and significantly lower binding energies for $Li_2O_2$. The binding energies of all the ORR intermediates shown in FIG. 1 were calculated for multiple skin alloy structures having crystal geometries determined most stable based on consideration of calculated minimum surface energy. The results identified skin alloy catalysts which are considered effective catalysts for utility in a Li-air battery.

Therefore, in a first embodiment, the present invention provides a Li-air battery, comprising:

an anode compartment comprising lithium or a lithium alloy as active metal;

an air cathode compartment comprising an air cathode having a matrix and a skin alloy catalyst;

an oxygen supply to the air cathode;

an electrolyte; and a lithium ion conductive membrane separating the anode from the cathode;

wherein the skin alloy catalyst comprises palladium and/or platinum metal having lattice positions of sub-atomic layers substituted with at least one metal atom selected from the group consisting of iron atoms, cobalt atoms, nickel atoms and copper atoms.

Catalyst activity of the skin alloy catalysts were calculated using the Arrhenius equation:

$$k = A_f e^{-E_a/RT}$$

wherein $A_f$ is the frequency factor which was estimated employing collision theory with the following equation:

$$A_f = \sigma (8kT/\pi\mu)^{1/2} N_A$$

The reduced mass is obtained with the equation:

$$1/\mu = 1/m_A + 1/m_B$$

and the collision cross-section:

$$\sigma = \pi (R_A + R_B)^2$$

Thus the catalytic activity was calculated with the following equation where $k_0$ is based on exchange current density:

$$A = k_B T \max_i (\ln(k_i/k_0))$$

Figure 3A:
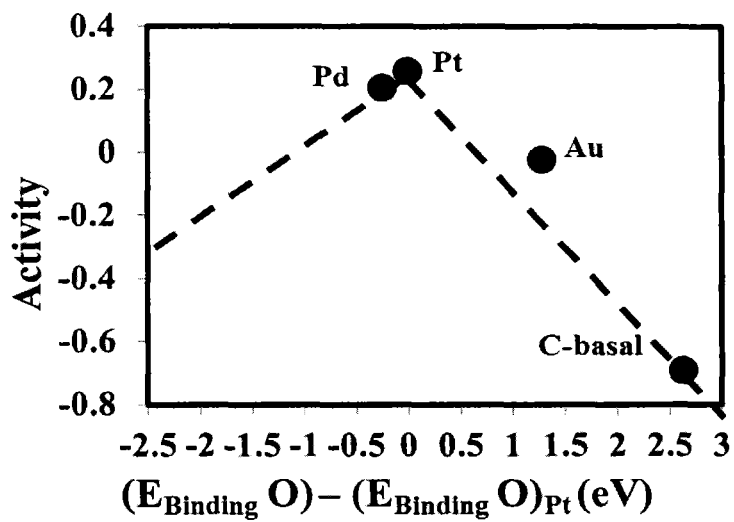
FIG. 3A shows catalyst activity for ORR determined according to DFT model calculations for selected noble metals.
Figure 3B:
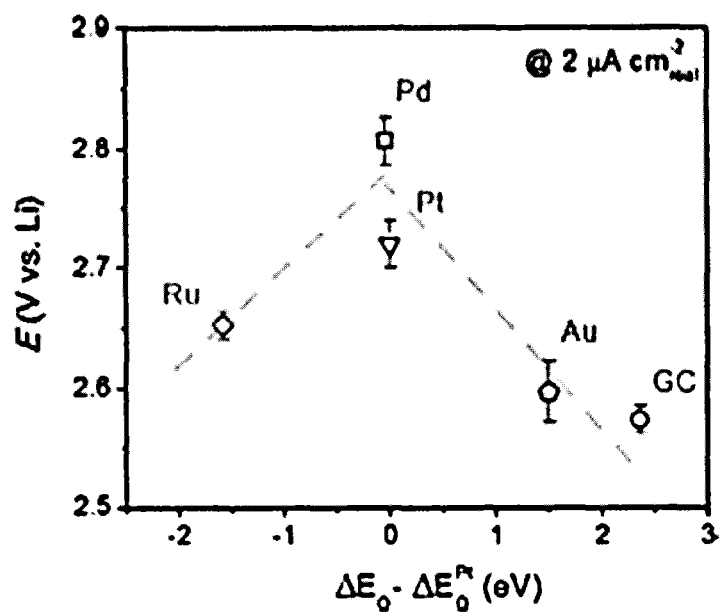
FIG. 3B shows experimental activity for ORR for selected noble metal catalysts.

Activities calculated in this manner for noble metals and carbon are shown in FIG. 3A and actual experimental results are shown in FIG. 3B. As indicated the results obtained according to the DFT model are in close agreement with the experimental data, thus supporting the validity of the DFT model.

Figure 4A:
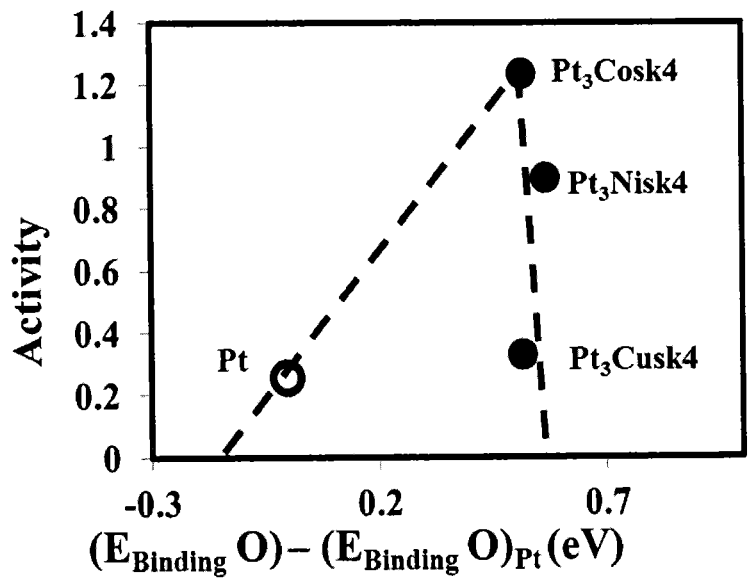
FIG. 4A shows relative ORR activities of Pt skin alloys according to an embodiment of the present invention.
Figure 4B:
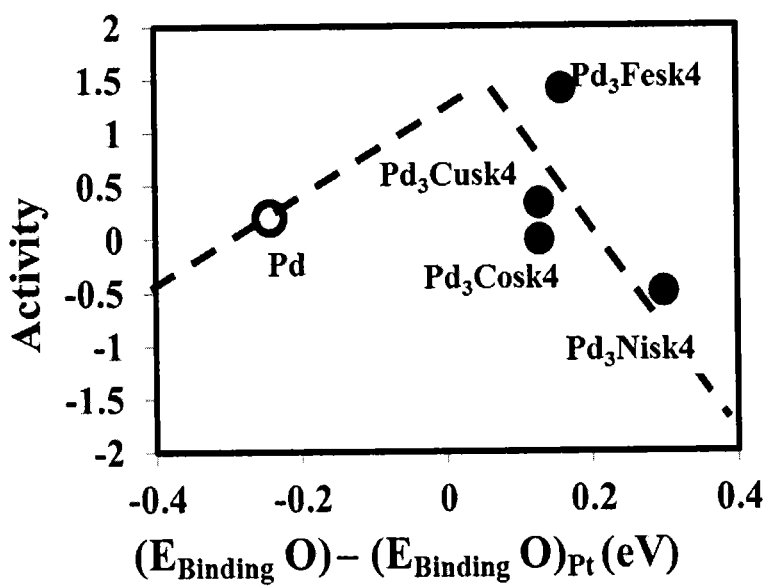
FIG. 4B shows relative ORR activities of Pd skin alloys according to an embodiment of the present invention.

Activity values determined according to the DFT model for skin alloys of platinum are shown in FIG. 4A and for skin alloys of palladium in FIG. 4B.

As indicated in FIG. 4A skin alloy catalysts of platinum wherein the dopant is nickel or cobalt have increased catalytic activity in comparison to platinum metal containing no skin dopant. A platinum skin alloy with copper was determined to have slightly more ORR activity in comparison to platinum metal containing no skin dopant.

Thus, in special aspects of the first embodiment the skin alloy catalyst may be a platinum-cobalt skin alloy, a platinum-nickel skin alloy or a combination thereof.

As indicated in FIG. 4B a skin alloy catalyst of palladium doped with iron was determined to have significantly increased ORR catalytic activity in comparison to palladium metal containing no skin dopant.

Thus, in another special aspect of the first embodiment the skin alloy catalyst may be a palladium-iron skin alloy.

As indicated in FIG. 1 one possible reaction pathway for the ORR reaction involves a one electron transfer to $O_2$ to form superoxide on the catalyst surface which associates with Li-ion to form $LiO_2$, diffusion of the $LiO_2$ into solution and subsequent chemical disproportionation to $Li_2O_2$ in solution. This pathway is labeled as the one electron mechanism and the DFT calculations may be employed to determine catalyst activity according to this mechanism.

The key determinant of catalyst activity for the one electron mechanism is the desorption of superoxide from the catalyst surface. Thus, catalyst binding energies for superoxide were determined and the ORR activity of the three catalysts having least superoxide binding energy calculated. From this work, a skin alloy of platinum doped with nickel was identified as having the best surface for the one electron mechanism.

Figure 5:
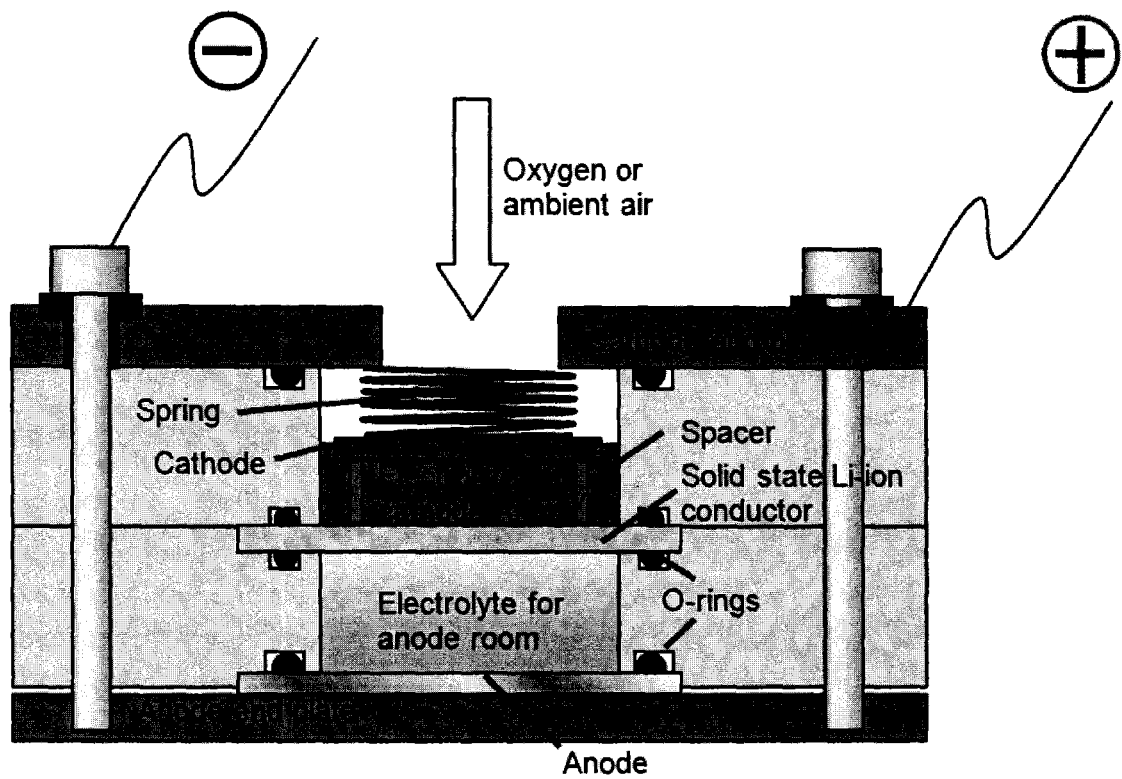
FIG. 5 shows a schematic diagram of a lithium-air battery according to one embodiment of the present invention.

An example of a Li-air battery according to an embodiment of the present invention is shown in FIG. 5 wherein the anode is separated from the air cathode by a Li-ion conductive membrane. The Li-ion membrane separates the battery into two compartments or rooms identified as anode room or cathode room in FIG. 5. The anode may be in contact with an electrolyte system or anolyte and the air cathode may be in contact with an electrolyte system or catholyte. The cell is housed in a container which is charged with oxygen or ambient air. The gas enters the cathode compartment through the opening of the cathode end plate.

In one embodiment the cathode compartment may comprise an ionic liquid. Suitable ionic liquids may comprise any of cations such as imidazolium cation, piperidinium cation, pyrrolidinium cation and ammonium cation and any of anions such as bis(trifluoromethansulfonyl)imide anion, bis(fluorosulfonyl)imide anion, tetrafluoroborate anion and hexafluorophosphate anion. In preferred embodiments the ionic liquid may be N-methyl-N-propylpiperidinium bis(trifluoromethansulfonyl)imide (PP13TFSI) or N,N-diethyl-N-methyl-N-(2-methoxyethyl)ammonium bis(trifluoromethansulfonyl)imide (DEMETFSI). Thus, an ionic liquid with high tolerance, i.e., chemical resistance to degradation, against $O_2$ radical is used. Also, the electrolyte system of this embodiment allows for exposure of the cathode to air as an oxygen source because the ionic liquid is not volatile and therefore electrolyte loss during the battery operation is not a problem.

Further, a salt that enhances the performance of the ionic liquid may be added to the cathode compartment. Such salt must be soluble in the ionic liquid and may serve to stabilize reduced $O_2$ radicals obtained at the cathode without forming solid precipitates which would congest the cathode matrix. Suitable salts that may be added to the cathode compartment include salts of organic cations compatible with an ionic liquid. Examples of such salts include tetraalkyl ammonium salts, imidazolium salts, pyridinium salts and piperidinium salts. In one embodiment, an additive salt may be tetrabutyl ammonium (TBA) bis(trifluoromethylsulfonyl)amide (TFSA).

Also, the electrolyte system of the present invention allows for exposure of the cathode to air as an oxygen source because the ionic liquid is not volatile and therefore electrolyte loss during the battery operation is not a problem.

Moreover, since the skin alloy catalyst is designed to minimize the binding energy of $Li_2O_2$, surface passivation of the catalyst associated with formation of $Li_2O_2$ should be minimized, resulting in a continuous discharge reaction and thus surprisingly significantly longer battery operation.

The purpose of the lithium ion conductive membrane is to allow reversible passage of lithium ions ($Li^+$) from the anode compartment to the cathode compartment, while protecting the anode from gases and moisture which may be present in the cathode compartment. The membrane may be constructed of a polymer, a ceramic or a composite thereof. To reduce any detrimental effect of gas on performance of the anode, an effective membrane will be fully impermeable or substantially impermeable to gas, thus preventing gas admitted to the cathode compartment from entrance to the anode compartment. A preferable partition may be a dense ceramic membrane. For example, the partition may be a Li-ion conducting ceramics plate such as Li—La—Ti—O based perovskite, a Li—Al—Ti—P—O based NASICON, a Li—La—Zr—O based garnet, a Li—P—S based solid electrolyte and a Li—Ge—P—S based solid electrolyte.

The use of solid state conductor also gives a capability of the introduction of the ambient air because it prevents moisture and carbon dioxide coming from the air from approaching the anode to deactivate it.

The positive electrode may be of a porous unit construction and comprises the skin alloy catalyst as described above, a conductive material and a binder. The cathode may be constructed by mixing the skin alloy catalyst, conductive material and optionally the binder and applying the mixture to a current collector of appropriate shape.

The skin alloy catalyst may be impregnated on a high surface area oxide support such as $Al_2O_3$, $ZrO_2$, $TiO_2$, $CeO_2$, or any mixed oxide thereof. The positive electrode may contain an electrically-conductive material which is chemically stable in the potential window of use of the cell.

Preferably the conductive material is porous and has a large specific surface area to provide high output. An example of such material may include but is not limited to a carbonaceous material such as Ketjen black, acetylene black, vapor grown carbon fiber, graphene, natural graphite, artificial graphite and activated carbon. Other suitable conductive materials may be conductive fibers, such as a metal fiber, metal powder, such as nickel and aluminum, and organic conductive materials, such as a polyphenylene derivative. In some embodiments mixtures of these materials may be employed. Other suitable conductive materials may be conductive ceramics such as titanium nitride and titanium carbide.

Suitable binders known to one of ordinary skill which are chemically stable in the potential window of use of the cell may include thermoplastics and thermosetting resins. For example, polyethylene, polypropylene, polytetrafluoroethylene (PTFE), Polyvinylidene fluoride (PVDF), styrene butadiene rubber, a tetrafluoroethylene hexafluoro ethylenic copolymer, a tetrafluoroethylene hexafluoropropylene copolymer (FEP), a tetrafluoroethylene perfluoroalkyl vinyl ether copolymer (PFA), ethylene-tetrafluoroethylene copolymer (ETFE resin), polychlorotrifluoroethylene resin (PCTFE), a propylene-tetrafluoroethylene copolymer, an ethylene-chlorotrifluoroethylene copolymer (ECTFE) and an ethylene-acrylic acid copolymer. These binders may be used independently, or mixtures may be used.

The components may be wet blended in the presence of a suitable solvent or dry blended using a mortar or other conventionally known mixing equipment. The mixture may then be applied to a charge collector by conventionally known methods. Any suitable charge collector may be employed. Preferred charge collectors may be any of carbon, stainless steel, nickel, aluminum and copper. In order to assist diffusion of the air, it may be preferable that the collector is a porous body, such as mesh. In certain embodiments the charge collector may comprise a protective coating of an oxidation-resistant metal or alloy to protect the collector from oxidation.

Due to the presence of the lithium conducting membrane the battery is divided into an anode compartment and a cathode compartment. The lithium electrolyte ion or mobile ion carrier may be any conventionally known to one of skill in the art and may include one or more of $LiPF_6$, $LiClO_4$, $LiAsF_6$, $LiBF_4$, $LiN(CF_3SO_2)_2$, $Li(CF_3SO_3)$ and $LiN(C_2F_5SO_2)_2$.

The metal of the anode may comprise any of lithium or a lithium alloy.

Non-aqueous solvents suitable for the anode compartment include cyclic carbonates, chain carbonates, cyclic esters, cyclic ethers and chain ethers. Examples of a cyclic carbonate include ethylene carbonate, propylene carbonate, butylene carbonate and vinylene carbonate. Examples of a chain carbonate include dimethyl carbonate, diethyl carbonate and methyl ethyl carbonate. Examples of a cyclic ester carbonate include gamma butyrolactone and gamma valerolactone. Examples of a cyclic ether include tetrahydrofuran and 2-methyltetrahydrofuran. Examples of a chain ether include dimethoxyethane and ethyleneglycol dimethyl ether. In some preferred embodiments the solvent may be a nitrile system solvent such as acetonitrile or an ionic liquid.

An example of a Li-air battery according to the present invention is schematically shown in FIG. 5. In FIG. 5 the membrane is labeled as solid state Li-ion conductor and the cathode compartment contains the liquid electrolyte and the cathode while the anode compartment contains the electrolyte and the lithium anode.

Numerous modifications and variations on the present invention are possible in light of the above description and examples. It is therefore to be understood that within the scope of the following Claims, the invention may be practiced otherwise than as specifically described herein. Any such embodiments are intended to be within the scope of the present invention.

The invention claimed is:

1. A Li-air battery, comprising:
    an anode compartment comprising lithium or a lithium alloy as active metal;
    an air cathode compartment comprising an air cathode having a matrix and a skin alloy catalyst;
    an oxygen supply to the air cathode;
    an electrolyte; and
    a lithium ion conductive membrane separating the anode from the cathode;
    wherein the skin alloy catalyst comprises palladium and/or platinum metal having a topmost atomic surface layer of palladium and/or platinum metal and atomic sub-layers of palladium and/or platinum wherein palladium and/or platinum lattice positions of a first four atomic sub-layers are substituted with at least one metal atom selected from the group consisting of an iron atom, a cobalt atom, a nickel atom and a copper atom.

2. The Li-air battery of claim 1, wherein the skin alloy catalyst is a platinum metal having a skin alloy wherein the metal atom substituent of the first four atomic sub-layers is cobalt.

3. The Li-air battery of claim 1, wherein the skin alloy catalyst is a platinum metal having a skin alloy wherein the metal atom substituent of the first four atomic sub-layers is nickel.

4. The Li-air battery of claim 1, wherein the skin alloy catalyst is palladium metal having a skin alloy wherein the metal atom substituent of the first tour atomic sub-layers is iron.

5. The Li-air battery of claim 1, wherein the air cathode compartment further comprises an ionic liquid.

6. The Li-air battery of claim 5, wherein the ionic liquid is an imidazolium cation, a piperidinium cation, a pyrrolidinium cation or an ammonium cation associated with an anion selected from the group consisting of a bis(trifluoromethanesulfonyl)imide anion, a bis(fluorosulfonyl)imide anion, a tetrafluoroborate anion and a hexafluorophosphate anion.

7. The Li-air battery of claim 5, wherein the ionic liquid further comprises a salt selected from the group consisting of a tetraalkyl ammonium salt, an imidazolium salt, a pyridinium salt and a piperidinium salt.

8. The Li-air battery of claim 5, wherein the ionic liquid is N,N-diethyl-N-methyl-N-(2-methoxyethyl)ammonium-bis(trifluoromethylsulfonyl)amide (DEME-TFSA), and the sodium ion electrolyte is sodium bis(trifluoromethylsulfonyl) amide (NaTFSA).

9. The Li-air battery of claim 1, wherein the lithium ion conductive membrane separating the anode compartment from the cathode compartment is a polymer, a ceramic material or a composite thereof.

10. The Li-air battery of claim 9, wherein the lithium ion conductive membrane comprises a ceramic material and the ceramic material is a dense ceramic membrane.

11. The Li-air battery of claim 10, wherein the dense ceramic membrane comprises one selected from the group consisting of a Li—La—Ti—O based perovskite, a Li—Al—Ti—P—O based NASICON, a Li—La—Zr—O based garnet, a Li—P—S based solid electrolyte and a Li—Ge—P—S based solid electrolyte.

12. The Li-air battery of claim 9, wherein the anode compartment further comprises a salt selected from the group consisting of $LiPF_6$, $LiClO_4$, $LiAsF_6$, $LiBF_4$, $LiN(CF_3SO_2)_2$, $Li(CF_3SO_3)$ and $LiN(C_2F_5SO_2)_2$.

13. The Li-air battery of claim 1, wherein the anode compartment further comprises a nonaqueous solvent selected from the group consisting of a cyclic carbonate, a chain carbonate, a cyclic ester, a cyclic ether and a chain ether.

14. The Li-air battery of claim 1, wherein the $O_2$ source supplied to the cathode compartment is one selected from the group consisting of pure $O_2$, ambient air and $O_2$ diluted with an inert gas.

15. The Li-air battery of claim 1, wherein the air electrode further comprises a conductive material and the conductive material is selected from the group consisting of Ketjen black, acetylene black, vapor grown carbon fiber, graphene, natural graphite, artificial graphite, activated carbon, a metal fiber, a metal powder and an organic conductive material.

16. A vehicle comprising the Li-air battery of claim 1.

17. The vehicle of claim 16, wherein the $O_2$ source supplied to the cathode compartment is ambient air.

* * * * *